US006393955B1

(12) United States Patent
McKeegan, Jr. et al.

(10) Patent No.: US 6,393,955 B1
(45) Date of Patent: May 28, 2002

(54) SYSTEM FOR CUTTING AND FINISHING MUNTINS (76) Inventors: John McKeegan, Jr., 45866 Denise Dr., Plymouth, MI (US) 48170; Rodney E. Bracy, 11805 Davis Rd., Middleville, MI (US) 49333

(*) Notice: Subject to any disclaimer, the term of this patent is extended or adjusted under 35 U.S.C. 154(b) by 0 days.

(21) Appl. No.: 09/344,482

(22) Filed: Jun. 25, 1999

Related U.S. Application Data (62) Division of application No. 08/813,699, filed on Mar. 7, 1997, now Pat. No. 6,021,701, and a continuation-in-part of application No. 08/680,507, filed on Jul. 8, 1996, now Pat. No. 5,860,346, which is a continuation of application No. 08/293,799, filed on Aug. 22, 1994, now abandoned.
(60) Provisional application No. 60/012,987, filed on Mar. 7, 1996.

(51) Int. Cl.[7] .............................. B23D 19/00; B26D 1/14
(52) U.S. Cl. ..................... 83/471.3; 83/471.1; 83/473; 83/485; 29/795; 29/897.31
(58) Field of Search ............................. 83/471.3, 471.1, 83/473, 485, 877, 878, 581; 29/897.31, 795

(56) References Cited

U.S. PATENT DOCUMENTS 5,295,292 A * 3/1994 Leopold ...................... 29/417

* cited by examiner

Primary Examiner—M. Rachuba
Assistant Examiner—Sean Pryor
(74) Attorney, Agent, or Firm—Plunkett & Cooney, P.C.; Arnold S. Weintraub (57) ABSTRACT A system is provided for cutting and finishing muntins. The system comprises a device for cutting muntins, a device for pinning muntins, and at least one device for punching muntins. The device for cutting muntins comprises a pair of cutting blades that are independently rotatable, translatable and positionable, and indexable, and further comprises means for precisely measuring muntins fed into the apparatus. The device for pinning muntins comprises means for stabilizing a muntin during punching; a guide, which is preferably magnetic; a pin or a blade, which is preferably made of metal; means for punching the pin or blade into a muntin; and means for precisely measuring the location at which a pin or blade is to be punched into a muntin. The at least one device for punching muntins comprises means for stabilizing a muntin strip; means for cutting the muntin strip; and means for translating the means for cutting. Power for the at least one punching apparatus is preferably pneumatic. More than one punching apparatus can be powered from the same pneumatic source.

8 Claims, 7 Drawing Sheets

SYSTEM FOR CUTTING AND FINISHING MUNTINS

CROSS-REFERENCE TO RELATED APPLICATIONS

This application is a division of Ser. No. 08/813,699 filed Mar. 7, 1997 U.S. Pat. No. 6,021,701, is a completion application of co-pending provisional U.S. patent application Ser. No. 60/012,987, entitled "SYSTEM FOR CUTTING AND FINISHING MUNTINS", filed Mar. 7, 1996, and is a continuation-in-part of U.S. patent application Ser. No. 08/680,507, now U.S. Pat. No. 5,860,346 filed Jul. 8, 1996 for Apparatus for Cutting and Assembling Muntins which is in turn a continuation of U.S. patent application Ser. No. 08/293,799, filed Aug. 22, 1994, for Apparatus for Cutting and Assembling Muntins now abandoned, the disclosures of which are hereby incorporated by reference.

BACKGROUND OF THE INVENTION

1. Field of the Invention

The present invention relates to the cutting and pinning of muntins. More particularly, the present invention pertains to devices for cutting and pinning muntins. Even more particularly, the present invention concerns a system for cutting and pinning muntins.

2. Description of the Prior Art

Traditionally, muntins, or muntin strips, have been used as decorative dividers or spacers between or outside panes of glass used for windows and doors. The muntins render the panes of glass aesthetically appealing. Because the muntins are frequently utilized between glass panes, they must present a flat mating surface to prevent the glass from mis-seating against them. A flat surface is reasonably easy to sustain if the muntins are all aligned in a single direction. However, it becomes more difficult to sustain a flat mating surface at an intersecting joint of two muntins laid out in different directions or in other directional configurations.

Another common problem is separation of the muntins, which may occur at intersecting joints over a period of time. This destroys both the designs created with the muntins and the aesthetic quality provided to the window by the placement of the muntins.

Several methods for assembling muntins to provide flat and strong intersecting surfaces are known. For example, muntin sections have been welded together to create a solid grid-type lattice structure, and then ground at the weld to eliminate rough surfaces created by the weld. However, the welded strips, although structurally solid, create other problems. Glass panes, whether in a window or a door, expand in warm temperatures and contract in cold temperatures. To accommodate for this expansion and contraction, the muntins must be flexible. Welded muntins tend to be inflexible, which causes the glass panes to eventually crack. Also, the grinding of the weld does not produce consistently flat surfaces at the weld. This promotes stress on the glass panes. Further, heat from welding occasionally causes the muntins to warp, which also causes stress on the glass panes.

Thus, other methods and devices have been developed to provide muntin grid assemblies that are reasonably solid and flexible. A typical example of this is the keeper developed by Allmetal, Inc. of Itasca, Ill. The Allmetal keeper is a plastic keeper or connector that is used to join muntin sections, wherein each plastic keeper is installed in a first muntin section. Additional muntin sections are then mounted onto each keeper to form a grid.

An alternate keeper is that developed by Hygrade Metal Moulding Manufacturing Corp. of Farmingdale, N.Y. The keeper sold by Hygrade has a different configuration than that of Allmetal, but is used in a similar fashion to that of Allmetal in that each keeper is installed in a first muntin section and additional muntin sections are then mounted onto each keeper to form a grid.

Although the keeper systems of Allmetal and Hygrade provide structured flexibility, both solidity and flexibility in lattice design are limited because of the shape of the joining ends of the muntin sections in these systems. The ends of muntin sections are commonly square cut, as needed, to mate flush against another muntin. However, problems arise when muntin sections are not shaped to receive a square cut. The square or flush cut has a tendency to rock or separate from a flush fit during assembly and use, even though the muntin section is seated on a plastic keeper. The rocking may cause bent edges which, if not caught during inspection, may contact the panes of glass, thus causing stress points on the panes of glass. Also, the joint may come apart during use, thus destroying the aesthetic appearance of the lattice.

Hygrade Metals, in addition to developing keepers, has attempted to address the above problem by notching muntin sections that are used in crossbar assemblies. The notched muntins are interlaced, one on top of another, with the notches facing each other. In most cases, the notches permit the two muntins to merge to the thickness of one muntin. However, if there is not an exact merger, the intersecting surfaces are not flat. Again, this provides stress on glass panes. Also, upon assembly and use, the expansion and contraction of the glass and metal due to changes in temperature causes the intersecting muntins to separate and the glass to contact the muntin, this creating stress on the glass panes.

It is also noteworthy that the assembly process generally used to assemble the muntins involves cutting the muntin sections either by routing or with a single, stationary blade or cutter that produces a square cut. Routing leaves large burrs that present assembly problems if not removed. To obtain an angle cut, a muntin is positioned at a desired angle and then cut by the single blade. The muntin sections are next either punched with a hole or are notched. The punched and notched muntin sections are moved to an assembly station, where an assembler assembles the notched pieces and/or inserts keepers in the punched holes and assembles the muntins together.

A single blade or cutter is usually operated by an operator, who positions the muntin strips and presents them to the cutter. This operation is both slow and labor-intensive. It also does not assure consistent, high-quality parts. The second common technique, routing, leaves burrs that must be ground to secure a good fit. This, again, is time-consuming and labor-intensive. Because the many problems, including inconsistency, tend to result in insulated windows of questionable quality or longevity, an apparatus and method of producing consistent muntin sections and high-quality muntin assemblies in a shorter time period and at a reduced cost is highly desirable. It is to the solution of the above-mentioned problems to which the present invention pertains.

SUMMARY OF THE INVENTION

In accordance with the present invention, there is provided in a first aspect a system for cutting and finishing muntins, the system comprising:

(a) at least one muntin strip cutting device, and (b) a muntin strip pinning device.

A first muntin strip cutting device for use herein comprises a pair of cutting blades that are independently rotatably drivable, translatable, and indexable. The device further comprises a housing and means for feeding a muntin strip into the device that precisely measures the fed muntin strip to conform with a pre-set length.

A second cutting device comprises means for stabilizing a muntin strip; means for cutting the muntin strip in a fish mouth; and means for translating the means for cutting. Each cutting device may be used conjointly with or independently of the cutting device depending on the type of cut imparted to the muntin strip.

The muntin strip pinning device in a first embodiment comprises a guide, the guide being preferably a magnetic guide. The pinning device further includes means for punching a pin into a muntin strip.

In a second embodiment, the pinning device includes a cutting blade for punching a pair of registering holes in a muntin strip. The pinning device of the embodiment, also, includes means for retracting the blade from the muntin strip after punching it thereinto.

The muntin strip pinning device hereof further comprises means for feeding muntin strips into the device that precisely measures the location at which a pin is to be inserted into the muntin strip or at which the holes or openings are to be formed.

For a more complete understanding of the present invention reference is made to the following detailed description and accompanying drawings. In the drawings, like reference characters refer to like parts throughout the several views, in which:

DETAILED DESCRIPTION OF THE PREFERRED EMBODIMENTS

As hereinabove noted, in a first aspect hereof, the present invention provides a system for cutting and pinning muntin strips which, generally, comprise:

(a) at least a first muntin strip cutting device, and (b) a muntin strip pinning device.

Figure 2:
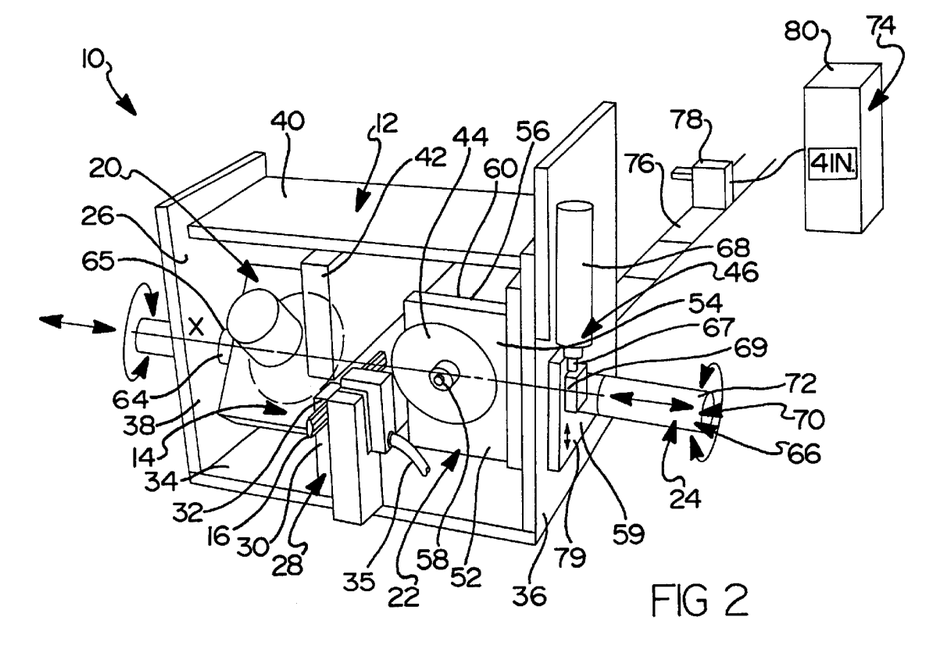
FIG. 2 is a perspective view of a cutting apparatus in accordance with a first aspect of the present invention.

In FIG. 2, there is depicted therein a first muntin cutting apparatus or device, generally depicted at 10. The apparatus 10 generally includes a housing 12 having a cutting station 14 disposed therein for cutting muntin strips 16 into muntin sections. As detailed below, and as noted above, the apparatus 10 used conjointly with a pinning apparatus 100 and a second muntin strip cutting device 200 for generating assemblable muntin strips that may be used in many window configurations. Both the pinning apparatus 100 and the cutting device 200 will be discussed hereinbelow in detail.

The cutting station 14 includes at least one cutting portion. Preferably, the cutting station 14 comprises a first cutting portion 20 and an opposing second cutting portion 22 aligned with the first cutting portion 20 and cooperable therewith. The cutting station 14 further comprises means 24 for translating and positioning each of the cutting portions 20, 22 within the cutting station 14. A muntin strip is disposed between and is aligned with the cutting portions 20, 22 for cutting the strip into sections. As shown, the housing 12 includes a support frame 26 constructed around the cutting portions 20, 22, as discussed in greater detail below.

The means 24 for translating and positioning the cutting portions 20, 22 preferably includes a clamping unit 28, which is used to hold the muntin strip 16 in place while it is being cut. The clamping unit 28 includes a seat portion 30 for seating the muntin strip 16 and a cover or cover portion 32 which urges against the seat portion 30 and the muntin strip 16 to hold and clamp the muntin strip 16 during the cutting operation. Means for operating, such as a hydraulic fluid or air (not shown), is operatively connected to the cover portion 32 via a conduit or hose 35 and is used to impart clamping pressure to the cover portion 32 in a well-known manner. While the means for operating is preferably a pneumatic system (not shown), an electrical system may be used to apply the clamping pressure.

While the clamping unit 28 holds the muntin strip 16 in place, the cutting portions 20, 22 cut the muntin strip 16 into sections, which are then assembled. The cutter housing 12 may be mounted on a stand (not shown). It also may be mounted on a table (not shown) in combination with various assembly systems.

The housing support frame 26 includes a base plate 34 which has opposing end walls 36, 38 attached thereto. A top plate 40 is disposed above and essentially parallel to the base plate 34 and is attached to the end walls 36, 38. A medial support 42, parallel to the end walls 36, 38, is disposed between the base plate 34 and the top plate 40. The medial support 42 provides support for the muntin clamping unit 28. The base plate 34, end walls 36, 38, top plate 40 and medial support 42 are preferably made from steel, but may be made from other metal such as aluminum or from another highly durable and strong material. Also, the above-described elements of the support frame 26 may be attached together by fasteners such as screws or the like (not shown).

The cutting portions 20, 22 are angularly indexable and are disposed within the housing 12. The first cutting portion 20 is removably mountable to one end wall 38 and the second cutting portion 22 is removably mountable to the second end wall 36 by fasteners such as screws or the like (not shown). The cutting portions 20, 22 are installed opposing each other and are axially aligned. The cutting portions 20, 22 are each constructed in a similar manner and therefore only one will be discussed.

As shown in FIG. 2, each cutting portion 20 or 22 includes a rotary cutting blade 44 and means 46 for angularly indexing the rotary cutting blade 44. The means 46 for angularly indexing positions the rotary cutting blade 44 for a desired cut on the muntin strip 16. The means 46 for angularly indexing may additionally be utilized to axially move each of the cutting stations 20, 22 along the axis x so that they either engage the strip 16 or not. In this fashion, the cutting stations 20, 22 may each be rotatively positioned and then axially moved into engagement with the strip to cut it at a desired angle.

The rotary cutting blade 44 is mounted on a plate 52 which is, in turn, attached to the means 46 for angularly indexing by welding or the like. The plate 52 has a first front surface 54 and a second rear surface 56. The cutting blade 44 is removably mounted onto a rotary axle 58 which is disposed on the first surface 54 of the plate 52. The rotary axle 58 extends through an aperture formed in the mounting plate 52, the blade 44 being mounted thereonto by any suitable mode.

The rotary axle 58 is removably attached to means 60 for rotatably driving the rotary axle 58 and cutting blade 44. The means 60 for rotatably driving is disposed on the second surface 56 of the plate 52 and may comprise any suitable drive, such as an electric motor or the like.

The cutting blade 44 may be an abrasive cutting wheel or a metal cutting wheel or circular saw or other type cutting blade. Preferably, a high speed cutting blade is used so as to prevent burning of stock and to provide for a clean edge after cutting. The high speed cutting blade substantially eliminates or reduces burring at the cut edges.

As noted, the means 60 for rotatably driving the cutting blade 44 is preferably an electric motor, but may be a hydraulic or pneumatic motor as well. These motors are commercially available and known to those skilled in the art.

The rotary cutting blade 44 is rotatably indexed to multiple positions to provide a plurality of cutting angles. The preferable cutting angle positions for the cutting blade 44 will be discussed in detail hereinbelow. The rotary cutting blade 44 is also adapted to be translated horizontally via the means 24 for translating. The means 24 for translating moves the blade through and away from the muntin strip 16 while the cutting blade 44 is rotating.

The means 46 for angularly indexing positions the rotary cutting blade 44 at the proper cutting angles before the rotary cutting blade 44 is translated to, through and away from the muntin strips 16. The means 46 for angularly indexing preferably includes a rotary indexing system, as described hereinbelow, for setting the plurality of cutting angles for the rotary cutting blade 44 before translating the rotary cutting blade 44 to and from the cutting station 14.

The rotary indexing system includes a shaft 64 which extends between the rotary cutting blade 44 and the means 60 for rotatably driving. The shaft 64 extends through an aperture 65 provided in the wall 38. A shaft seats through an aperture in each end wall 36, 38. A link plate 59 is slidingly mounted onto the shaft 64 for indexing the shaft 64. The link plate is actuated by first means 66 for moving. The first means 66 for moving comprises a first cylinder 68, mounted on the end wall 36, pivotally connected to the link plate 59 via a pivot pin and a mounting block 69. The first cylinder 68 actuates the link plate 59 to index the shaft 64 and position the rotary cutting blade 44 at the desired cutting angle.

When the cylinder 68 is actuated, a cylinder rod 67 is extended or retracted, causing the mounting block 69 and, thus, the link plate 59 to move in the directions shown by the arrow 79. Because the plate 59 is fixed to the shaft 64, rotation thereof is imparted thereto, thus causing the cutting blade 44 to index. The indexing angle of the cutting blade 44 is preferably determined by a fluid control system (not shown) which is in fluid communication with the first cylinder 68. The control system (not shown) causes the fluid to activate the first cylinder 68 to the desired indexing angle. Alternatively, the first cylinder 68 may be pre-set to desired indexing angles by pre-setting the first cylinder 68 in a manner well-known to those skilled in the art.

The means 24 for translating, preferably, includes second means 70 for moving also mounted to the link plate 59. The second means 70 comprises a second powered cylinder 72 removably mounted to the link plate 59 and fixedly connected to the shaft 64. In use, after the first cylinder 68 is used to position the rotary cutting blade 44, the second cylinder 72 translates or moves the cutting blade 44 into position to cut the muntin strip 16. When the cutting operation is complete, the second cylinder 72 retracts the rotary cutting blade 44 from the muntin strip 16.

The first cylinder 68 and the second cylinder 72 are preferably pneumatic cylinders, but may be hydraulic cylinders. The cylinders 68, 72 are commercially available and are known to those skilled in the art.

The cutting apparatus 10 preferably has its operations controlled by an electronic programmable controller system (not shown) which is commercially available from any controller manufacturer, such as Allen-Bradley Co. of Michigan. In the alternative, a pneumatic controller system such as those commercially available from Industrial Air & Hydraulic Co. of Michigan, or a hydraulic controller system such as those commercially available from Pabco Fluid Power Co. of Michigan, may be used.

The apparatus 10 additionally includes means 74 for setting the length of the strip 16. The means 74 for setting the length of the strip generally includes a track 76, a roller 78, and a device 80 for measuring the position of the roller 78 on the track 76. Such systems are well known. One such system is produced by Accurate Technology under the tradename Proscale. The means 74 for setting the length of the strip may be configured to measure the length of the strip 16 from the axis x where the cutting takes place to the location of the roller 78. In this way, one using the system can know with accuracy to one thousandth of an inch the length of the muntin strip 16 that is produced on the apparatus 10. This is accomplished by rolling the roller 78 into engagement with the end of the muntin strip 16. The device 80 for measuring will then display the length of the muntin strip 16.

Figure 12:
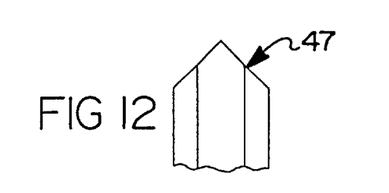
FIG. 12 is a plan view of a muntin strip with a miter end as produced by the cutting device of FIG. 2.
Figure 13:
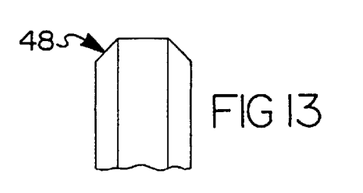
FIG. 13 is a plan view of a muntin strip with a bevelled end as produced by the cutting device of FIG. 2.

The apparatus 10 may be used to produce three preferable basic types of cut. More particularly, each of the cutting stations 20, 22 may be used to produce the cuts shown in FIGS. 12, 13 and 14. Specifically, the device or apparatus may be used to produce a miter cut 47, as shown in FIG. 12, where each opposed cutting station 20, 22 cuts the strip at substantially the same angle. Additionally, the apparatus may be used to produce a bevelled cut 48, as shown in FIG. 13, which is similar to the miter cut 47 except that one of the cutting stations 20, 22 is rotated subsequent to making the angled cut so that the blade is normal to the muntin strip and is engaged therewith to cut off the end of the strip 16, which provides the flat-ended.

Figure 14:
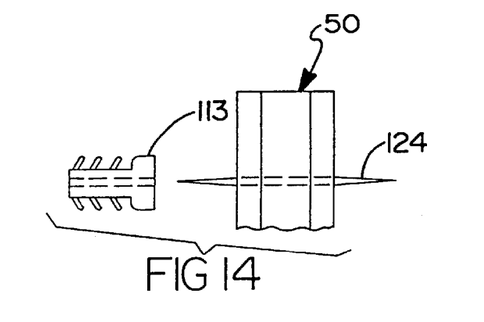
FIG. 14 is a plan view of a muntin strip with a square end as produced by the cutting device of FIG. 2.

Finally, the apparatus 10 may be used to produce a flat cut 50, as shown in FIG. 14. In this instance, only one station 20 or 22 is engaged with the strip while positioned normal thereto, which produces the cut shown in FIG. 14. Because each of the cutting stations 20, 22 may be rotated and laterally positioned, a cut having substantially any configuration may be made to the muntin strip 16.

This present cutting device or apparatus is more particularly described in U.S. patent application Ser. No. 08/680,507, filed Jul. 8, 1996, for "Apparatus For Cutting and Assembling Muntins," the disclosure of which is hereby incorporated by reference.

As detailed hereinbelow, the cutting device may be eliminated from the system or used conjointly with or independent of the second cutting device 200, depending of the configuration of the end of the muntin strip that is desired.

Figure 1:
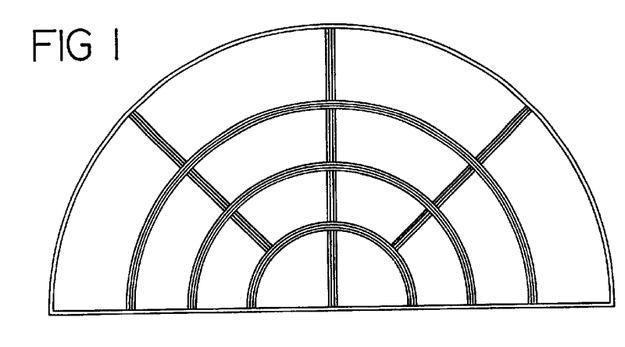
FIG. 1 is a front view of an exemplary muntin lattice assembly of the type enabled by the present invention.

In forming a lattice, such as is shown in FIG. 1, a plurality of muntin strips are interconnected with suitable fasteners (FIG. 14). To effect this interconnection, ordinarily the fasteners are pinned or otherwise interconnected to each other. Thus, the present invention incorporates a pinning device for enabling interconnection.

Figure 3:
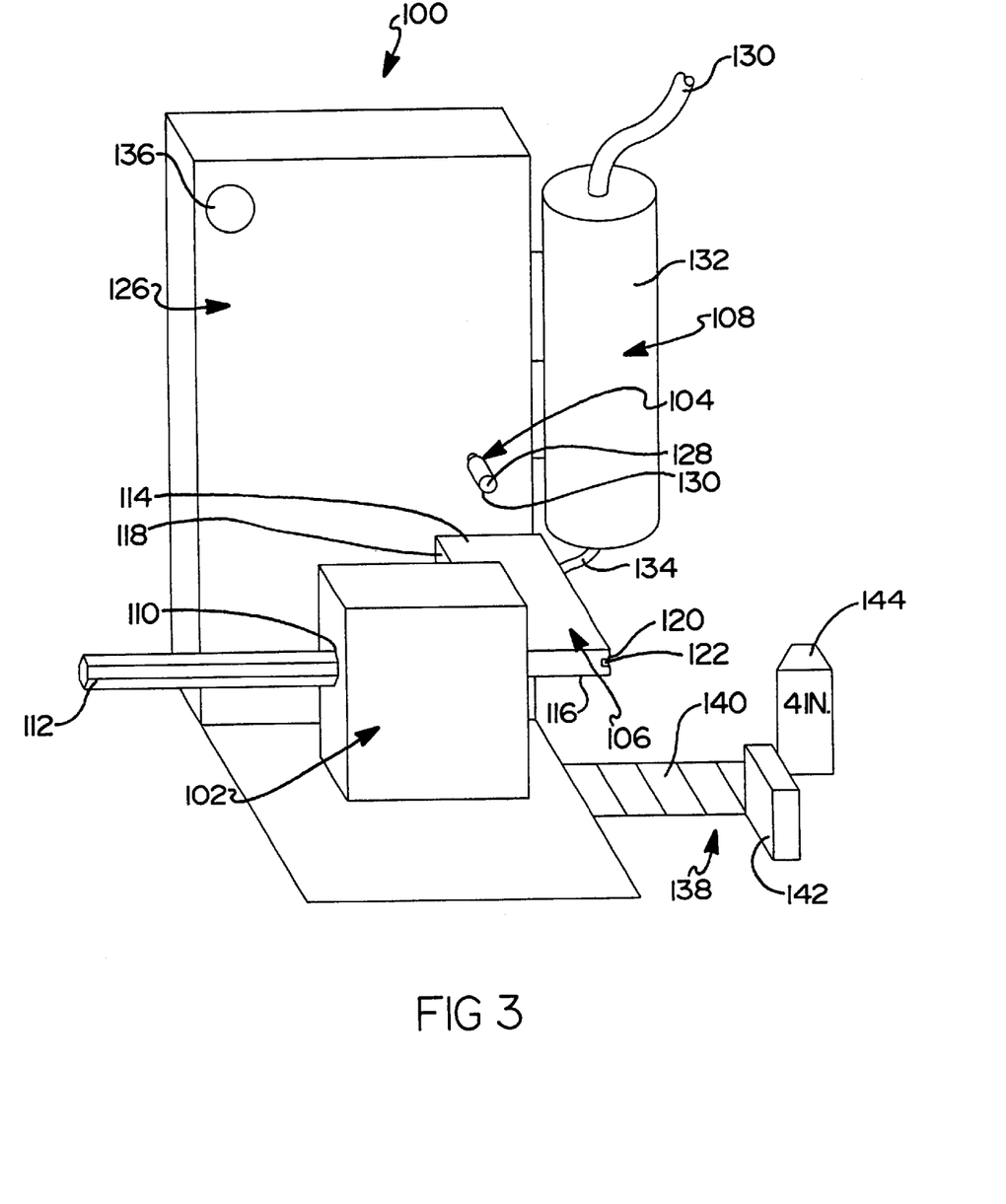
FIG. 3 is a perspective view of a pinning apparatus in accordance with a second aspect of the present invention.
Figure 4:
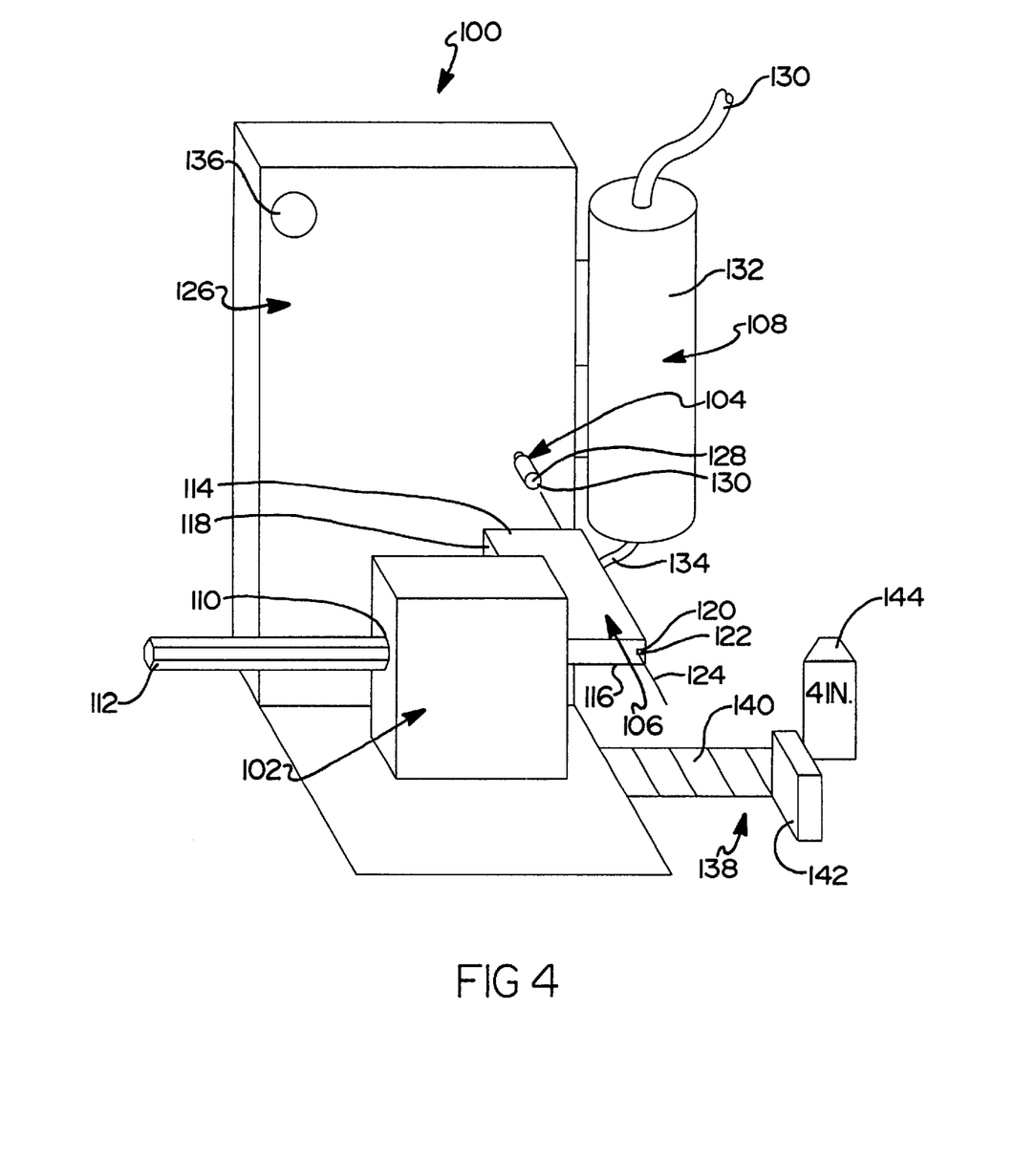
FIG. 4 is a perspective view of the pinning apparatus with a pin placed therein.
Figure 5:
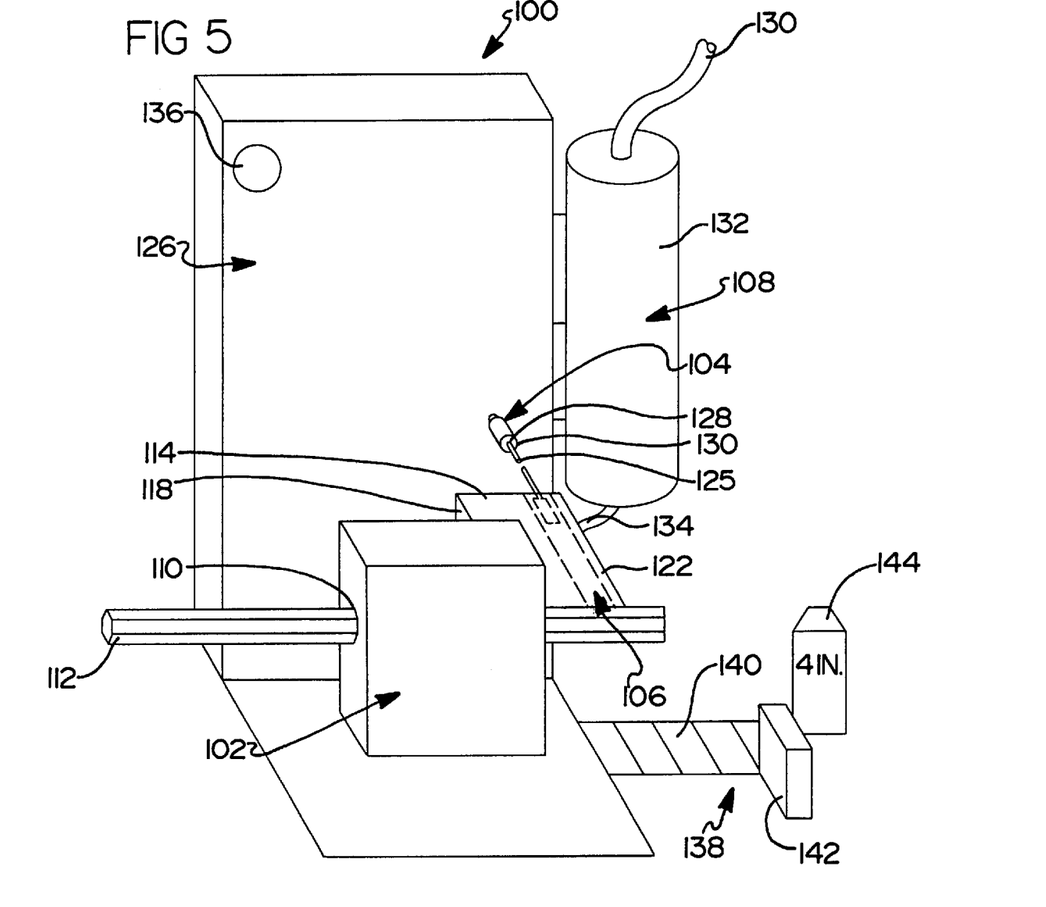
FIG. 5 is a perspective view of the pinning apparatus with a muntin in position to have a pin inserted therein.

Referring now to FIGS. 3–5, there is shown a first embodiment of a pinning apparatus 100 in accordance herewith for enabling interconnection. The apparatus 100 generally includes a stabilizer 102, a plunger 104, a guide plate 106, and means 108 for actuating the plunger 104.

The stabilizer 102 is used to hold a muntin strip in position while it is being pinned. The stabilizer 102 is preferably formed from any strong durable material such as steel or the like. More particularly, the stabilizer 102 is a solid member with a channel 110 formed therethrough and into which a muntin strip 16 or 112 is inserted. The channel 110 has the same configuration as the muntin 112. Because there are several differently sized muntins available for use in windows, one of several differently configured stabilizers may be used such that the muntin 16 or 112 may slide through the channel 110. Alternatively, the stabilizer 102 may contain a plurality of channels of different sizes to accommodate differently-sized muntins. In yet another alternative, the stabilizer 102 functions to clamp the strip 16 or 112 in place. In that instance, the stabilizer has a seating portion and a top portion and would function substantially similarly to the clamping unit 28 of the cutting apparatus 10.

The guide 106 is preferably formed from a magnetic material, for reasons described hereinbelow. The guide 106 has a top surface 114, a bottom surface 116, a side 118 in close proximity to the stabilizer 102, and a side 120 opposite side 118 and thus farther from the stabilizer 102. A channel 122 is formed in the side 120 of the guide 106. The channel 122 extends along the entire length of the side 120 and is configured to receive a pin 124. The pin 124 is, preferably, but not necessarily, formed from a metal such that it is attracted to the guide, which is magnetic. In this fashion, and as shown in FIG. 4, the pin 124 slidably seats in the channel 122 via the magnetic attraction.

A plunger 104 is telescopingly housed within a base 126 to which the stabilizer 102 and the guide 106 are mounted. The stabilizer 102 and the guide 106 may be mounted to the base via welding, screws, or other means for mounting that are well known to the skilled artisan. The plunger 104 has a small recess 128 formed at the end 130 thereof. The end of the pin 124 is placed in the recess 128 in the plunger 104 by any suitable means, including manual placement, and seats in the channel 122 in the guide 106.

The plunger 104 is moved horizontally outwardly from the base 126 via the means 108 for actuating the plunger. The means 108 is, preferably, pneumatic and includes a compressed air supply (not shown) connected via a hose 130 to a valve 132. The valve 132 is, preferably, mounted to the base 126 via any well known means for mounting. The valve 132 may be adjusted to ensure that the air pressure is appropriate for the device 100.

A second conduit or hose 134 provides communication of the air from the valve 132 to the plunger 104 to slidably horizontally extend the plunger 104 toward the guide 106 and push the pin 124 toward the muntin 112 seated in front thereof, as depicted in FIG. 5. The pin 124 stays within the muntin 112 upon being plunged thereinto, to allow a lattice of muntins to be formed as described hereinbelow. The device 100 is activated via a push button 136 that is connected to a second valve (not shown) or to an actuator (not shown) that allows the air to push the plunger 104 outward from the base 126. Such valves and switches are well known to the skilled artisan.

The device or apparatus 100 additionally includes means 138 for measuring the distance from the end of the muntin 112 to the location on the muntin where the pin 124 or blade 125 is to be inserted. The means 138 generally includes a track 140, a roller 142, and a device 144 for measuring the position of the roller 142 on the track 140. Such systems are well known. One such system is produced by Accurate Technology under the tradename Proscale. The means 138 for measuring may be configured to measure the length of the strip 112 from the end of the strip 112 to where the pin 124 is inserted. In this way, a user can accurately and with precision determine the distance from the end of the muntin strip 112 to the location where the pin 124 is inserted. This is accomplished by rolling the roller 142 into engagement with the end of the muntin strip 112. The device for measuring 144 displays the distance.

In use, the muntin 112 is slid into the channel 122 until the end of the muntin 112 abuts the roller 142, which is set to the desired distance. A pin 124 is inserted into the channel 122 in the guide 106 so that its end seats in the recess 128 in the plunger 104. The button 136 is depressed to activate the apparatus 100 and the plunger 104 is pushed out towards the muntin 112, thereby projecting the pin 124 into the muntin 112 with sufficient force that the pin 124 travels completely through the muntin 112 and is seated therein with the ends of the pin 124 extending from either side of the muntin 112 (FIG. 14).

The pin 124 stays in the muntin 112 after pinning, after which a catch 113 (FIG. 14) may be slidably mounted onto the pin and inserted into the end of an adjoining muntin 112. Each catch is slidably received in the end of a muntin 112 such that a plurality of muntins may be connected. The configuration of the connected muntins is dependent upon the design desired by the user, one such configuration being shown in FIG. 1.

With reference now to FIGS. 6–11, there is depicted a second embodiment of the pinning device. According to this embodiment, a blade 125 is deployed for providing registering openings, in lieu of the pin 124. In all other respects, the embodiments are substantially the same, Thus, the blade 125 is fixedly mounted to the plunger 104 and slides in the guideway or channel 122. When the means 108 for actuating the plunger drives the plunger 104 into the muntin 112, the blade 125, which is fixedly mounted to the plunger 104, punches a hole in the muntin 112 by being driven all the way therethrough. When the means 108 retracts the plunger 104 from the muntin, to allow the muntin to be removed from the device and to allow another muntin to be punched, the blade 125 is, also, retracted. In this way, the device punches a hole in the muntin 112 rather than inserting a pin 124 into the muntin. A catch (not shown) is inserted through the holes punched in the muntin for attachment to catches in other muntins as in the first embodiment.

Figure 5A:
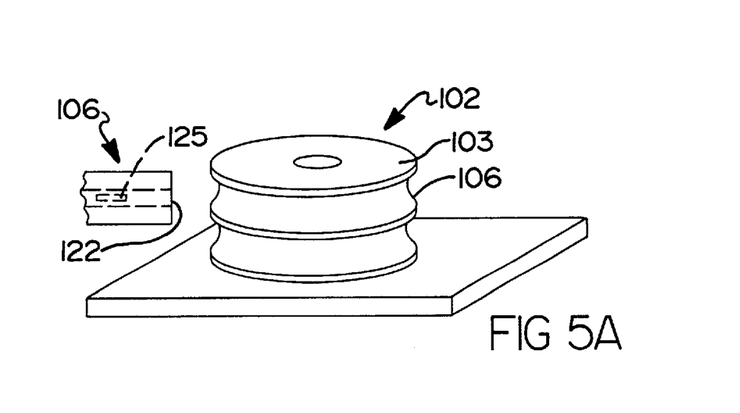
FIG. 5A is a perspective view of a stabilizer of the pinning apparatus.

As shown in FIG. 5A, the stabilizer 102 may comprise a rotatable disc 103 having at least one circumferential groove 105 formed therein, into which is seated a muntin to be pierced by a pin 124 or blade 125. The disc 103 is aligned with the guide 106 and, thus, defines a stop for either a pin or a blade. Preferably, the disc 103 has a plurality of grooves, two being shown in FIG. 5A, of different sizes to accommodate different diameter muntin strips.

Figure 13A:
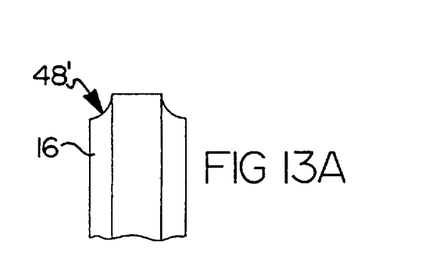
FIG. 13A is a plan view of a muntin strip with a fish mouth end as produced by the cutting device of FIG. 6.

As noted above, the present invention contemplates a second cutting device shown generally at 200 in FIGS. 6–11. The device 200 is used to trim a flat end of a muntin strip (not shown) into a fish mouth shape as shown at 48' in FIG. 13A. The device 200 includes a base 202, a housing 204, a cutting tool 206 disposed within the housing and a cam 208 for controlling the path of the cutting tool 206.

Figures 6, 7:
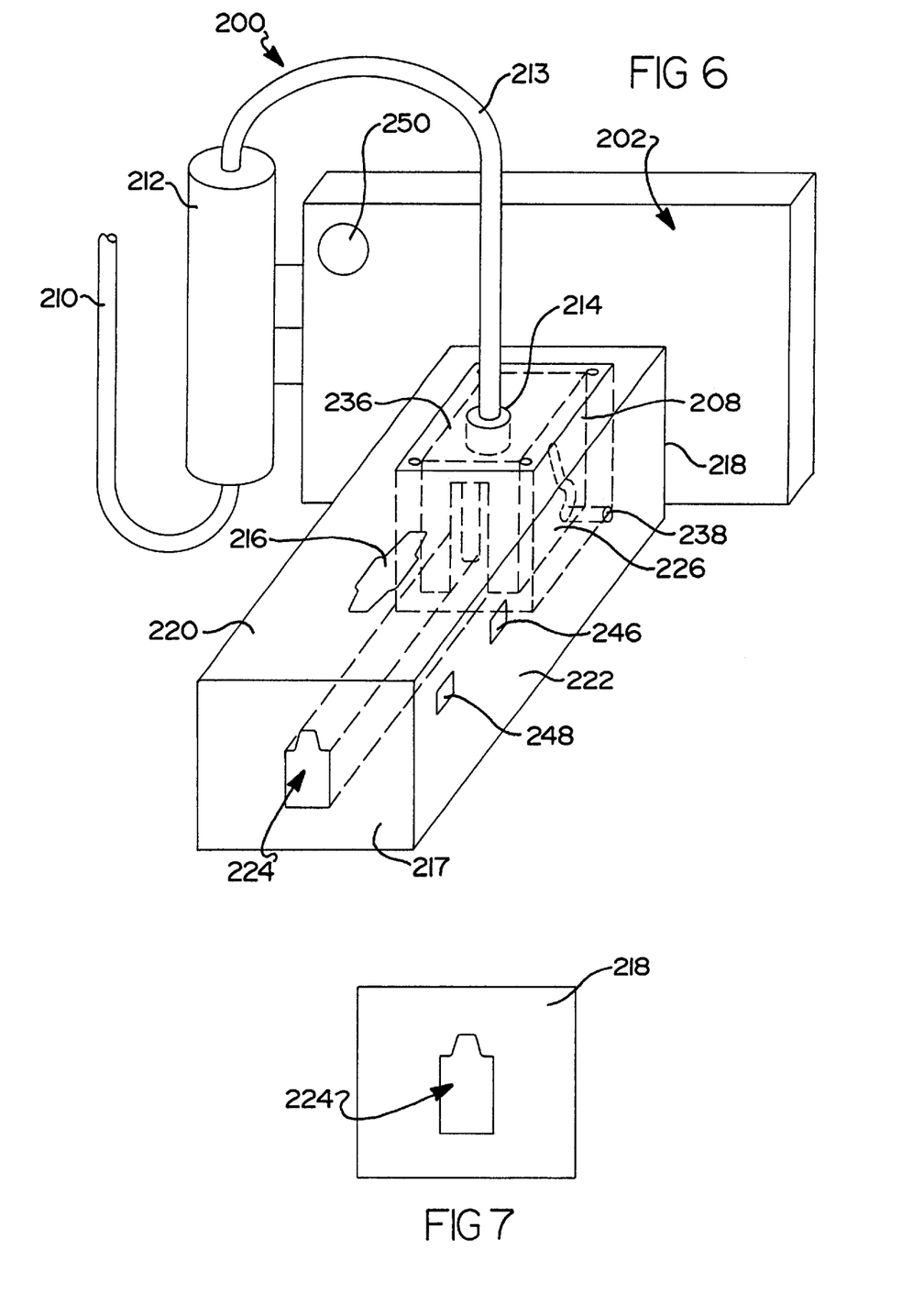
FIG. 6 is a perspective view, partly in phantom, with some components eliminated, for clarity, of a second cutting device in accordance with a third aspect of the present invention.
FIG. 7 is a rear elevational view of the device of FIG. 6.

The cutting device 200 is, preferably, pneumatically operated for driving the cutting tool 206. However, an electric motor or a hydraulic system may also be used, although they are not as preferable. As such, one end of a conduit or hose 210 is connected to a compressed air source (not shown), is connected at its other end to a valve 212. The valve 212 serves as means for regulating the pressure of the air supplied to the device 200. The valve 212 is preferably mounted to the base via any suitable means for mounting. An air cylinder 214 is connected at one end to the valve 212 via any suitable coupling such as a hose 213 and at its other end to a cam block 208 disposed within the housing 204, as detailed below.

The housing 204 has at least one and preferably two or more muntin receiving cavities formed therein. More particularly, the housing 204 has a first cavity 216 for insertingly receiving an end of a muntin strip therein. As such, the cavity has a configuration substantially similar to the exterior configuration of a muntin strip.

A second cavity 224 is formed in the housing 204. The second cavity 224 has a substantially rectangular configuration. However, the top is slightly tapered, as can be seen in FIG. 7. The cavity 224 extends substantially the entire length of the housing 204 and is in registry with the cavity. The cavity 224 has substantially the same configuration as the tool 206 such that the tool 206 may be slidably received therein. The tool 206, which will be described in detail hereinbelow, slides within the cavity 224.

Figure 8:
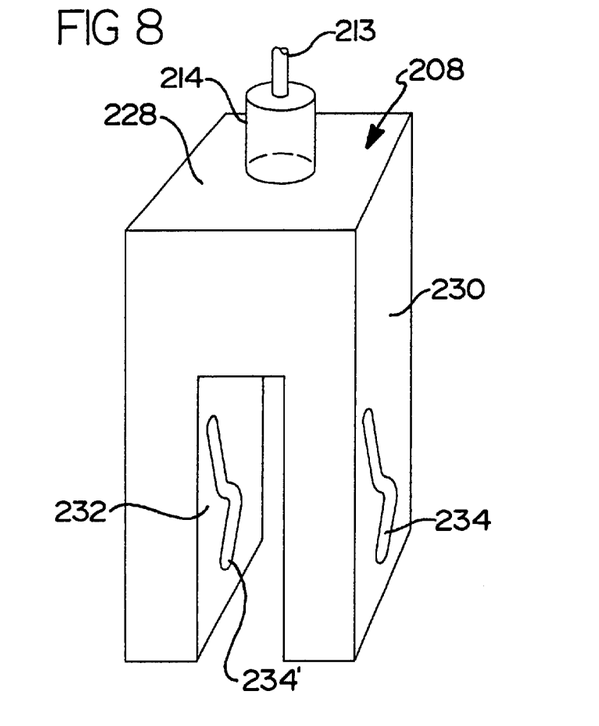
FIG. 8 is a perspective view of a cam piece used in the device of FIG. 6.
Figure 9:
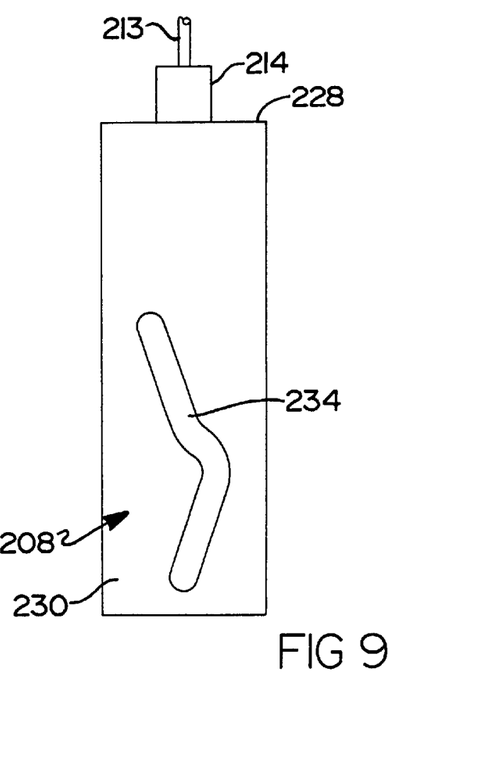
FIG. 9 is a side view of the cam piece of FIG. 8.

The housing 204 has a third cavity 226 formed therein which communicates with the second cavity 224. The cavity 226 is substantially rectangular and is configured to slidably receive a cam or cam block 208 therein. The cam 208 is seated in the cavity 226 and is functionally contained therewithin. As shown in FIGS. 8 and 9, the cam 208 has a top surface 228, a first leg 230 and a second substantially identical leg 232 spaced apart from the first leg. Each of the legs 230, 232 has a race 234, 234' formed therein. The cam is seated in the third cavity 226 such that the top surface 228 of the cam is parallel to the top surface 220 of the housing 204. The cam 208 is oriented in the third cavity 226 such that the cutting tool 206 may slidably fitted between the two legs 230, 232 when it is slidably seated in the second cavity 224. The cam 208 slides up and down in the third cavity 226 in response to air pressure provided thereto by the air cylinder 214, which is connected to the top surface 228 of the cam. A mounting plate 236 is secured to the top surface of the housing 204 to secure the cylinder 214 in position.

The housing 204 has an aperture 238 formed through the first side 222 providing communication between the outside of the housing 204 and the third cavity 226. The aperture 238 is configured to slidably receive a rolling axle 240 therethrough. The axle fits through the race 234 in the first leg 230, through an aperture 242 in the cutting tool 206, and then through the race 234' in the second leg 232. A plate or screw (not shown) is then inserted into the aperture 238 in the housing 204 to provide sealing thereof.

The third cavity 226 may have a spring (not shown) or the like disposed therein to bias the cam 208 upwardly. As such, when pressure is supplied to the top 228 of the cam 208 via the air cylinder 214, which is secured to the top of the cam 208 as described hereinabove, the cam is forced downward. The downward motion of the cam 208 is translated into horizontal motion of the cutting tool 206, which will be described hereinbelow in more detail.

Figure 10:
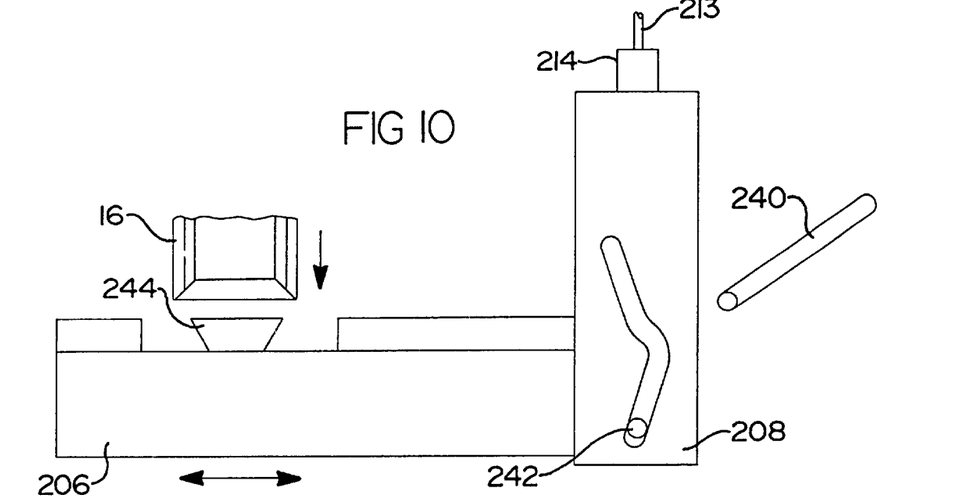
FIG. 10 is a side view of the cutting tool used in the punching device of FIG. 6.
Figure 11:
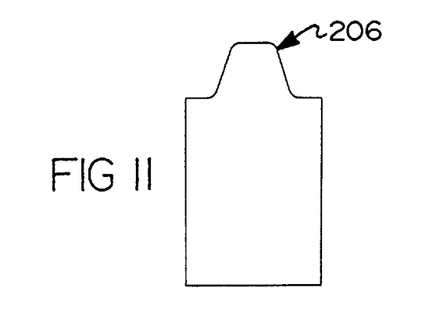
FIG. 11 is an end view of the tool of FIG. 10.

Looking to the races 234, 234', it is apparent that as the cam 208 is forced downwardly by air pressure from the cylinder 214, the cutting tool 206 is forced to follow the path defined by the races 234, 234'. Referring to FIG. 10, the forward end portion of the cutting tool 206 is shown disposed in the cam housing 208 and the rolling axle 240 is shown positioned for fitment in the aperture 242 of the cutting tool. The cutting tool 206 includes a tooth 244 that moves laterally with the cutting tool 206. The tooth 244 is located at the center of the first cavity 216 when no air pressure is supplied to the third cavity 226. A muntin 16 is positioned above the cutting tool 244. As shown, the muntin 16 is a hollow tubular member having a planar top wall 16a, a planar bottom wall 16b, and a pair of planar side walls 16c and 16d, the walls 16a, 16b, 16c, and 16d cooperating to form a muntin of generally trapezoidal cross-section and having a hollow interior 16e. As such, when the device 200 is in a resting state, i.e. when no air pressure is supplied, the tooth 244 will seat within the interior 16e of the muntin strip 16 that is placed in the first cavity 216 and moved downwardly into the cavity 224 and about the tooth.

When air pressure is supplied via the cylinder 214, the tooth 244 and the rest of the cutting tool 206 shift toward the back wall 218 of the housing 204. This trims one side 16d of the muntin strip 16. As the cam 208 continues downward, the cutting tool 206 begins to shift toward the front wall 217 of the housing 204. As the cam 208 moves toward the front wall 217 of the housing 204, it trims the other side 16c of the muntin strip 16. In this fashion, a muntin strip 16 having the configuration depicted at 50 in FIG. 14 may be inserted into the device 200 and will emerge with a fish mouth cut 48', as shown resembling FIG. 13A.

The device 200 is activated via a start button 250 which connects the air source (not shown) to the third cavity 226.

The first side 222 of the housing 204 additionally has two small apertures 246, 248 formed therethrough proximate the first cavity 216 and providing communication between the first cavity 216 and the exterior of the housing 204. As the tooth 244 moves towards the back wall 218, the piece of the muntin (not shown) that is trimmed is blown out of one of the apertures 246. Then, as the tooth 244 travel in the opposite direction and trims the other side of the muntin (not shown), the trimmed piece is blown out of the other aperture 248. The air pressure provided accomplishes this task.

In an alternate embodiment hereof, cutting device 200 as described may be paired with a similar one and be powered by a single air source, thus allowing cutting of two muntins simultaneously as the cutting tool 206 translates.

It is to be appreciated that the punching device 200 may be used conjointly with or independently of the cutting device 10 for forming a fish mouth cut.

In use the present invention allows a user to cut, trim and prepare muntins to be mounted to one another. The present invention additionally allows a user to produce muntins with many different configurations that will not damage glass panes between which they are to be seated. This is accomplished by the precise tooling provided by the specific components of the present system.

The present invention provides for production of high quality, well-assembled lattice matrices that retain their assembled configurations for extended periods of time, eliminate muntin section separation, and thus reduce any stresses on multi-layered glass panes. This provides for a long-lasting, aesthetically pleasing window or door. The apparatus provides for multiple-angle miter cutting of muntin strips and close tolerance fitting.

While the invention has been illustrated and described in detail in the drawings and the foregoing description, the same to be considered as illustrative and not restrictive in character, it being understood that only the preferred embodiment has been shown and described and that all changes and modifications that come within the spirit of the invention are desired to be protected.

Having thus described the present invention, what is claimed is:

1. A device for cutting and finishing a muntin, the device comprising:
   (a) means for stabilizing the muntin;
   (b) means for cutting an end of the muntin; and
   (c) means for translating the means for cutting in a first direction to sever a first side of the muntin and in a second direction, opposite to the first directions to sever a second side of the muntin to provide a fish mouth cut to the muntin, wherein the means for cutting is a cutting blade, an end portion of the muntin being positionable about the cutting blade for cutting by the cutting blade.

2. The device of claim 1 wherein the means for translating the means for cutting comprises:
   a) a cam having a race formed therein;
   b) a roller insertable into the race;
   c) means for moving the cam, and
   wherein the means for cutting is connected to the cam and the roller such that movement of the cam causes translation of the means for cutting.

3. The device of claim 1, wherein the cutting blade is at least one tooth.

4. A device for cutting and finishing an end portion of a muntin, the muntin having a hollow interior and first and second side portions, the device comprising:
   a cutting tool for cutting the end portion of the muntin, the cutting tool being adapted to be positioned into the end portion of the muntin for cutting the side portions of the muntin; and
   means for translating the cutting tool against the first side portion from the inside of the muntin to the outside of the muntin in a first direction to sever a part of the first side of the muntin and against the second side portion from the inside of the muntin to the outside of the muntin in a second direction to sever a part of the second side of the muntin to provide the end portion of the muntin with a fish mouth cut, the first direction being opposite to the second direction.

5. The device of claim 4 wherein the cutting tool is a cutting blade, the end portion of the muntin being positionable about the blade to place the blade in the inside of the muntin.

6. The device of claim 4 wherein the means for cutting comprises at least one tooth, the end of the muntin being positionable about the tooth to place the tooth in the inside of the muntin.

7. A device for cutting and finishing an end portion of a muntin having first and second sides and a hollow interior, the device comprising:
   a housing, the housing having a first and a second passageway, the first passageway having a first and a second end with the first end being adapted to receive the end portion of the muntin and the second end opening in said second passageway and positioning the end portion of the muntin in the second passageway for cutting;
   a cutting tool slidably seated within the second passageway, the cutting tool being normally positioned below the second end of the first passageway and adapted to seat within the end portion of the muntin; and
   means for translating the cutting tool inside the second passageway from the inside of the muntin to the outside of the muntin in a first direction to sever the first side portion of the muntin and from the inside of the muntin to the outside of the muntin in a second direction to sever the second side portion of the muntin, the first and second severings providing the end portion of the muntin with a fish mouth cut.

8. The device of claim 7 wherein the means for translating is air pressure driven.

* * * * *